(12) United States Patent
Hofer et al.

(10) Patent No.: US 8,827,640 B2
(45) Date of Patent: Sep. 9, 2014

(54) SYSTEM AND METHODS OF ASSEMBLING A SUPERSONIC COMPRESSOR ROTOR INCLUDING A RADIAL FLOW CHANNEL

(75) Inventors: Douglas Carl Hofer, Clifton Park, NY (US); Dhananjayarao Gottapu, Bangalore (IN)

(73) Assignee: General Electric Company, Niskayuna, NY (US)

( * ) Notice: Subject to any disclaimer, the term of this patent is extended or adjusted under 35 U.S.C. 154(b) by 805 days.

(21) Appl. No.: 13/037,675

(22) Filed: Mar. 1, 2011

(65) Prior Publication Data

US 2012/0224952 A1 Sep. 6, 2012

(51) Int. Cl.
| | |
|---|---|
| *F04D 21/00* | (2006.01) |
| *B23P 11/00* | (2006.01) |
| *F04D 29/28* | (2006.01) |
| *F04D 29/62* | (2006.01) |
| *F04D 29/053* | (2006.01) |
| *B23P 15/00* | (2006.01) |

(52) U.S. Cl.
CPC .............. *F04D 21/00* (2013.01); *F04D 29/282* (2013.01); *F04D 29/284* (2013.01); *F04D 29/624* (2013.01); *F04D 29/053* (2013.01); *B23P 15/006* (2013.01)
USPC ... 415/181; 416/182; 416/186 R; 29/888.024; 29/888.025; 29/889.23

(58) Field of Classification Search
CPC ..... F04D 21/00; F04D 29/282; F04D 29/284; B23P 15/006
USPC ............ 415/181; 416/182, 186 R; 29/888.02, 29/888.024, 888.025, 889.4, 889.2, 889.23
See application file for complete search history.

(56) References Cited

U.S. PATENT DOCUMENTS

| | | | |
|---|---|---|---|
| 2,925,952 | A | 2/1960 | Garve |
| 4,006,997 | A * | 2/1977 | Friberg et al. ................. 415/181 |
| 4,012,166 | A | 3/1977 | Kaesser et al. |

(Continued)

FOREIGN PATENT DOCUMENTS

| | | |
|---|---|---|
| EP | 1126133 A2 | 8/2001 |
| GB | 885661 | 12/1961 |
| WO | 2009025803 A1 | 2/2009 |

OTHER PUBLICATIONS

Shawn P. Lawlor and Peter Baldwin, Conceptual Design of a Supersonic CO2 Compressor, Proceedings of ASME 2005, ASME Turbo Expo 2005, Jun. 6-9, 2005, 8 pages, Ramgen Power Systems, Bellevue, WA.

(Continued)

*Primary Examiner* — Igor Kershteyn
(74) *Attorney, Agent, or Firm* — Andrew J. Caruso (57) ABSTRACT

A supersonic compressor rotor that includes a rotor disk that includes a substantially cylindrical endwall, a radially inner surface, and a radially outer surface. The endwall extends between the radially inner surface and the radially outer surface. A plurality of vanes are coupled to the endwall. The vanes extend outwardly from the endwall. Adjacent vanes form a pair and are spaced a circumferential distance apart such that a flow channel is defined between each pair of circumferentially-adjacent vanes. The flow channel extends generally radially between an inlet opening and an outlet opening. A first supersonic compression ramp is coupled to the endwall. The first supersonic compression ramp is positioned within the flow channel to facilitate forming at least one compression wave within the flow channel.

16 Claims, 6 Drawing Sheets

(56) References Cited

U.S. PATENT DOCUMENTS

| | | |
|---|---|---|
| 4,199,296 A | 4/1980 | de Chair |
| 4,463,772 A | 8/1984 | Ball |
| 4,620,679 A | 11/1986 | Karanian |
| 4,704,861 A | 11/1987 | Mowill |
| 5,525,038 A | 6/1996 | Sharma et al. |
| 5,881,758 A | 3/1999 | Koncsek et al. |
| 6,062,819 A * | 5/2000 | Zangeneh et al. ........ 416/186 R |
| 6,358,003 B2 | 3/2002 | Schlechtriem |
| 6,428,271 B1 | 8/2002 | Ress, Jr. et al. |
| 6,488,469 B1 | 12/2002 | Youssef et al. |
| 7,070,388 B2 | 7/2006 | Meng et al. |
| 7,293,955 B2 | 11/2007 | Lawlor et al. |
| 7,296,396 B1 | 11/2007 | Wilson et al. |
| 7,334,990 B2 | 2/2008 | Lawlor et al. |
| 7,337,606 B2 | 3/2008 | Brouillette et al. |
| 7,434,400 B2 | 10/2008 | Lawlor et al. |
| 2009/0107557 A1 | 4/2009 | Conners |
| 2009/0196731 A1 | 8/2009 | Lawlor |
| 2010/0005763 A1 | 1/2010 | Bloom |
| 2010/0043389 A1 | 2/2010 | Conners |
| 2011/0142592 A1* | 6/2011 | Nagel et al. ........................ 415/1 |
| 2012/0087779 A1* | 4/2012 | Vysohlid et al. .............. 415/145 |
| 2012/0107106 A1* | 5/2012 | Hofer et al. ................... 415/181 |

OTHER PUBLICATIONS

H.J. Lichtfuss, H. Starken, Supersonic Cascade Flow, Progress in Aerospace Sciences vol. 15, 1974, pp. 37-149.

M. F. El-Dosoky, A. Rona and J. P. Gostelow, An Analytical Model for Over-Shroud Leakage Losses in a Shrouded Turbine Stage, ASME Turbo Expo 2007, Power for Land, Sea and Air, GT2007, May 2007, pp. 1-10, Montreal Canada.

Allan D. Grosvenor, David A. Taylor, Jonathan R. Bucher, Michael J. Aarnio, Paul M. Brown, Robert D. Draper, Shawn P. Lawlor, Measured and Predicted Performance of a High Pressure Ratio Supersonic Compressor Rotor, ASME Turbo Expo 2008, Power for Land, Sea and Air, GT2008, Jun. 2008, pp. 1-12, Berlin, Germany.

* cited by examiner

SYSTEM AND METHODS OF ASSEMBLING A SUPERSONIC COMPRESSOR ROTOR INCLUDING A RADIAL FLOW CHANNEL

BACKGROUND OF THE INVENTION

The subject matter described herein relates generally to supersonic compressor systems and, more particularly, to a supersonic compressor rotor for use with a supersonic compressor system.

At least some known supersonic compressor systems include a drive assembly, a drive shaft, and at least one supersonic compressor rotor for compressing a fluid. The drive assembly is coupled to the supersonic compressor rotor with the drive shaft to rotate the drive shaft and the supersonic compressor rotor.

Known supersonic compressor rotors include a plurality of strakes coupled to a rotor disk. Each strake is oriented circumferentially about the rotor disk and defines an axial flow channel between adjacent strakes. At least some known supersonic compressor rotors include a supersonic compression ramp that is coupled to the rotor disk. Known supersonic compression ramps are positioned within the axial flow path and are configured to form a compression wave within the flow path.

During operation of known supersonic compressor systems, the drive assembly rotates the supersonic compressor rotor at a high rotational speed. A fluid is channeled to the supersonic compressor rotor such that the fluid is characterized by a velocity that is supersonic with respect to the supersonic compressor rotor at the flow channel. At least some known supersonic compressor rotors discharge fluid from the flow channel in an axial direction. As fluid is channeled in an axial direction, supersonic compressor system components downstream of the supersonic compressor rotor are required to be designed to receive axial flow. As such, known supersonic compressor systems required additional components to discharge fluid in a radial direction. Known supersonic compressor systems are described in, for example, U.S. Pat. Nos. 7,334,990 and 7,293,955 filed Mar. 28, 2005 and Mar. 23, 2005 respectively, and United States Patent Application 2009/0196731 filed Jan. 16, 2009.

BRIEF DESCRIPTION OF THE INVENTION

In one embodiment, a supersonic compressor rotor is provided. The supersonic compressor rotor includes a rotor disk that includes a substantially cylindrical endwall, a radially inner surface, and a radially outer surface. The endwall extends between the radially inner surface and the radially outer surface. A plurality of vanes are coupled to the endwall. The vanes extend outwardly from the endwall. Adjacent vanes form a pair and are spaced a circumferential distance apart such that a flow channel is defined between each pair of circumferentially-adjacent vanes. The flow channel extends generally radially between an inlet opening and an outlet opening. A first supersonic compression ramp is coupled to the endwall. The first supersonic compression ramp is positioned within the flow channel to facilitate forming at least one compression wave within the flow channel.

In another embodiment, a supersonic compressor system is provided. The supersonic compressor system includes a housing that includes an inner surface that defines a cavity that extends between a fluid inlet and a fluid outlet. A rotor shaft is positioned within the housing. The rotor shaft is rotatably coupled to a driving assembly. A supersonic compressor rotor is coupled to the rotor shaft. The supersonic compressor rotor is positioned between the fluid inlet and the fluid outlet for channeling fluid from the fluid inlet to the fluid outlet. The supersonic compressor rotor includes a rotor disk that includes a substantially cylindrical endwall, a radially inner surface, and a radially outer surface. The endwall extends between the radially inner surface and the radially outer surface. A plurality of vanes are coupled to the endwall. The vanes extend outwardly from the endwall. Adjacent vanes form a pair and are spaced a circumferential distance apart such that a flow channel is defined between each pair of circumferentially-adjacent vanes. The flow channel extends generally radially between an inlet opening and an outlet opening. A first supersonic compression ramp is coupled to the endwall. The first supersonic compression ramp is positioned within the flow channel to facilitate forming at least one compression wave within the flow channel.

In yet another embodiment, a method of assembling a supersonic compressor rotor is provided. The method includes providing a rotor disk that includes an endwall, a radially inner surface, and a radially outer surface. The endwall extends between the radially inner surface and the radially outer surface. A plurality of vanes are coupled to the endwall. Adjacent vanes form a pair and are spaced a circumferential distance apart such that a flow channel is defined between each pair of circumferentially-adjacent vanes. The flow channel extends generally radially between an inlet opening and an outlet opening. A first supersonic compression ramp is coupled to the endwall. The first supersonic compression ramp is configured to enable at least one compression wave to form within the flow channel.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION OF THE INVENTION

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "supersonic compressor rotor" refers to a compressor rotor comprising a supersonic compression ramp disposed within a fluid flow channel of the supersonic compressor rotor. Supersonic compressor rotors are said to be "supersonic" because they are designed to rotate about an axis of rotation at high speeds such that a moving fluid, for example a moving gas, encountering the rotating supersonic compressor rotor at a supersonic compression ramp disposed within a flow channel of the rotor, is said to have a relative fluid velocity which is supersonic. The relative fluid velocity can be defined in terms of the vector sum of the rotor velocity at the supersonic compression ramp and the fluid velocity just prior to encountering the supersonic compression ramp. This relative fluid velocity is at times referred to as the "local supersonic inlet velocity", which in certain embodiments is a combination of an inlet gas velocity and a tangential speed of a supersonic compression ramp disposed within a flow channel of the supersonic compressor rotor. The supersonic compressor rotors are engineered for service at very high tangential speeds, for example tangential speeds in a range of 300 meters/second to 800 meters/second.

The exemplary systems and methods described herein overcome disadvantages of known supersonic compressor assemblies by providing a supersonic compressor rotor that facilitates channeling a fluid through a generally radial flow path. More specifically, the embodiments described herein include a supersonic compression ramp that is coupled to an endwall of a rotor disk to define the radial flow channel. In addition, providing a supersonic compressor rotor with a radial flow channel enables a supersonic compressor system to be designed with a radial flow discharge.

Figure 1:
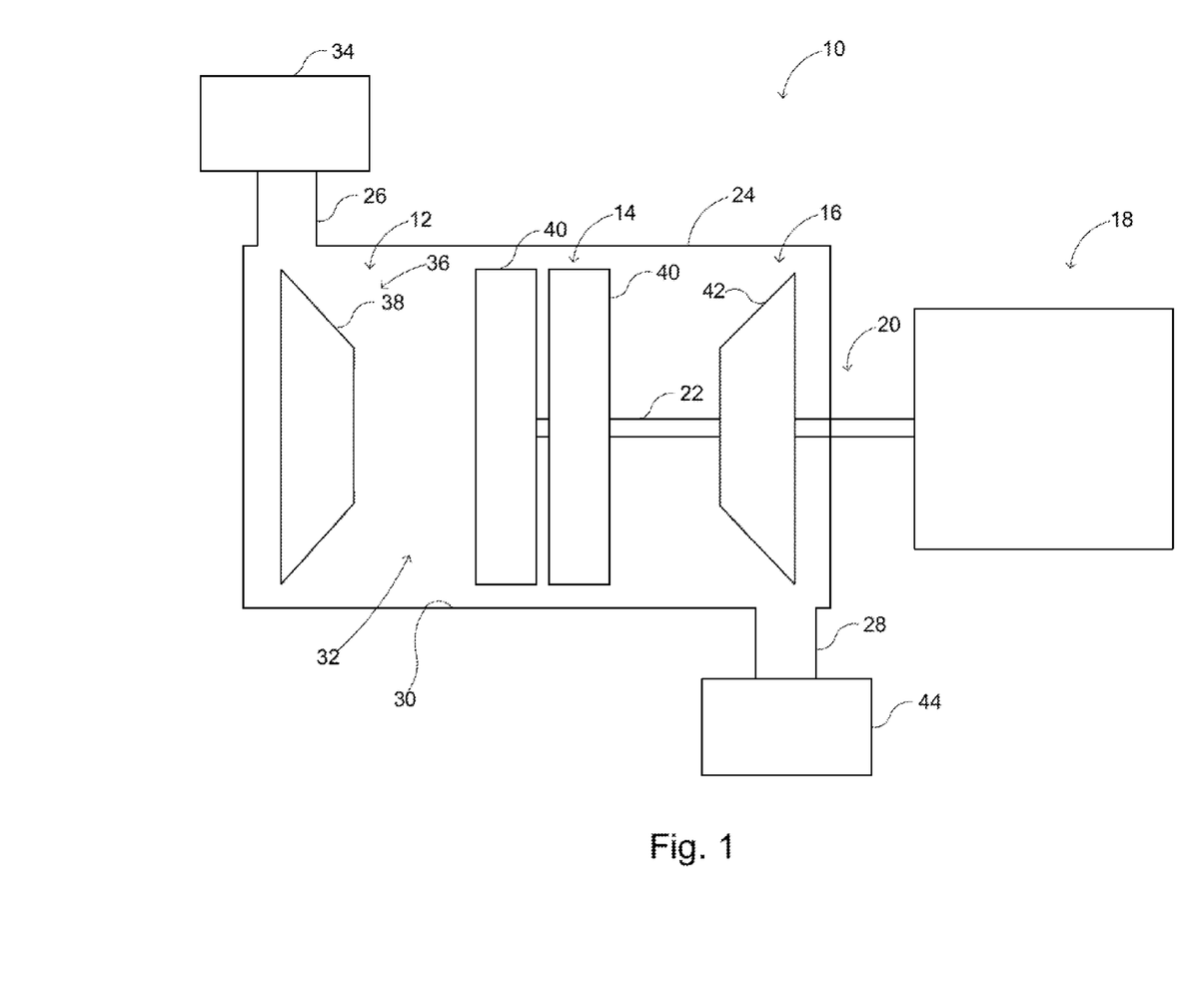
FIG. 1 is a schematic view of an exemplary supersonic compressor system.

FIG. 1 is a schematic view of an exemplary supersonic compressor system 10. In the exemplary embodiment, supersonic compressor system 10 includes an intake section 12, a compressor section 14 coupled downstream from intake section 12, a discharge section 16 coupled downstream from compressor section 14, and a drive assembly 18. Compressor section 14 is coupled to drive assembly 18 by a rotor assembly 20 that includes a drive shaft 22. In the exemplary embodiment, each of intake section 12, compressor section 14, and discharge section 16 are positioned within a compressor housing 24. More specifically, compressor housing 24 includes a fluid inlet 26, a fluid outlet 28, and an inner surface 30 that defines a cavity 32. Cavity 32 extends between fluid inlet 26 and fluid outlet 28 and is configured to channel a fluid from fluid inlet 26 to fluid outlet 28. Each of intake section 12, compressor section 14, and discharge section 16 are positioned within cavity 32. Alternatively, intake section 12 and/or discharge section 16 may not be positioned within compressor housing 24.

In the exemplary embodiment, fluid inlet 26 is configured to channel a flow of fluid from a fluid source 34 to intake section 12. The fluid may be any fluid such as, for example a liquid, a gas, a gas mixture, and/or a liquid-gas mixture. Intake section 12 is coupled in flow communication with compressor section 14 for channeling fluid from fluid inlet 26 to compressor section 14. Intake section 12 is configured to condition a fluid flow having one or more predetermined parameters, such as a velocity, a mass flow rate, a pressure, a temperature, and/or any suitable flow parameter. In the exemplary embodiment, intake section 12 includes an inlet guide vane assembly 36 that is coupled between fluid inlet 26 and compressor section 14 for channeling fluid from fluid inlet 26 to compressor section 14. Inlet guide vane assembly 36 includes one or more inlet guide vanes 38 that are coupled to compressor housing 24 and are stationary with respect to compressor section 14.

Compressor section 14 is coupled between intake section 12 and discharge section 16 for channeling at least a portion of fluid from intake section 12 to discharge section 16. Compressor section 14 includes at least one supersonic compressor rotor 40 that is rotatably coupled to drive shaft 22. Supersonic compressor rotor 40 is configured to increase a pressure of fluid, reduce a volume of fluid, and/or increase a temperature of fluid being channeled to discharge section 16. Discharge section 16 includes an outlet guide vane assembly 42 that is coupled between supersonic compressor rotor 40 and fluid outlet 28 for channeling fluid from supersonic compressor rotor 40 to fluid outlet 28. Fluid outlet 28 is configured to channel fluid from outlet guide vane assembly 42 and/or supersonic compressor rotor 40 to an output system 44 such as, for example, a turbine engine system, a fluid treatment system, and/or a fluid storage system.

During operation, intake section 12 channels fluid from fluid source 34 towards compressor section 14. Compressor section 14 compresses the fluid and discharges the compressed fluid towards discharge section 16. Discharge section 16 channels the compressed fluid from compressor section 14 to output system 44 through fluid outlet 28.

Figure 2:
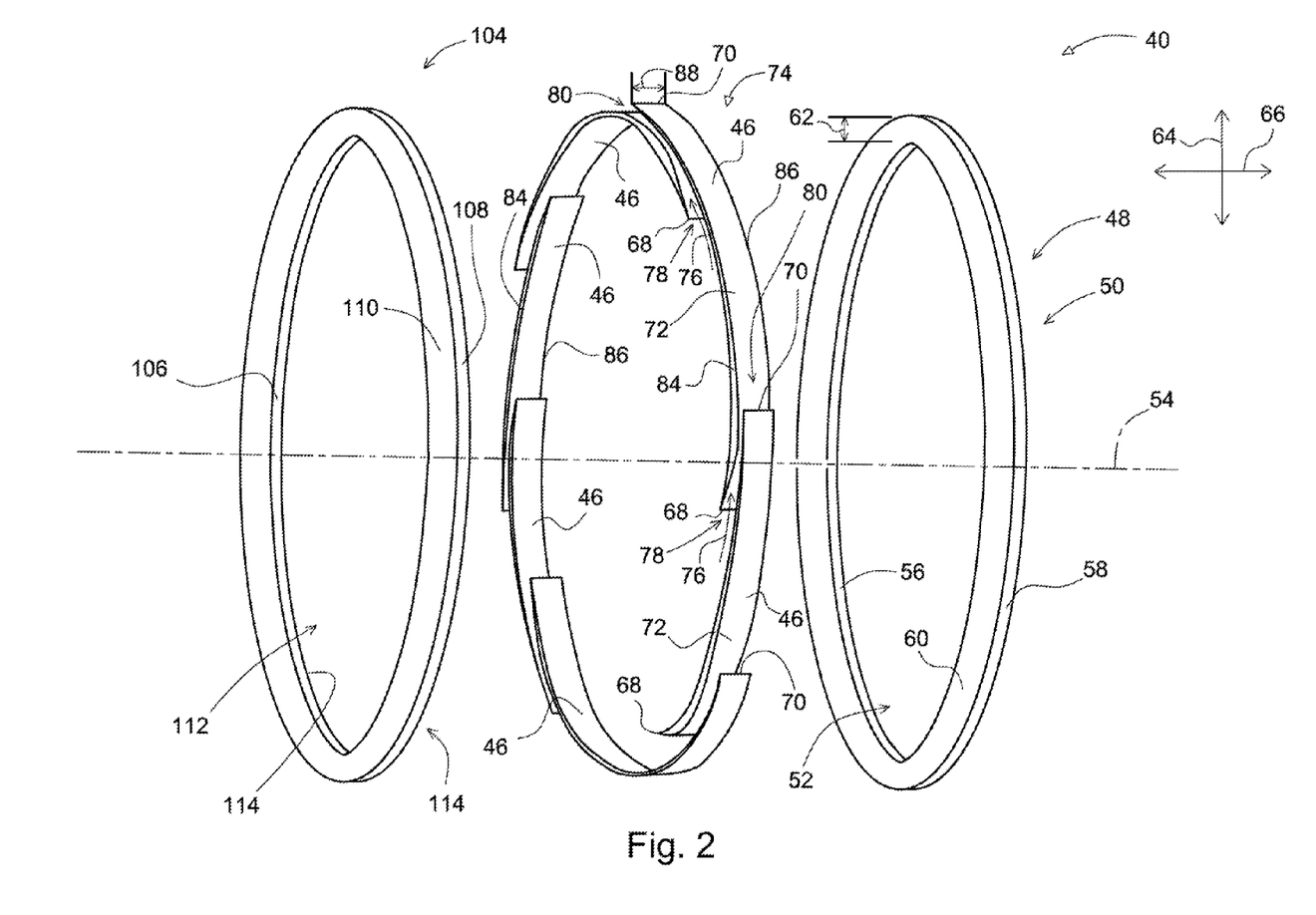
FIG. 2 is an exploded perspective view of an exemplary supersonic compressor rotor that may be used with the supersonic compressor system shown in FIG. 1.
Figure 3:
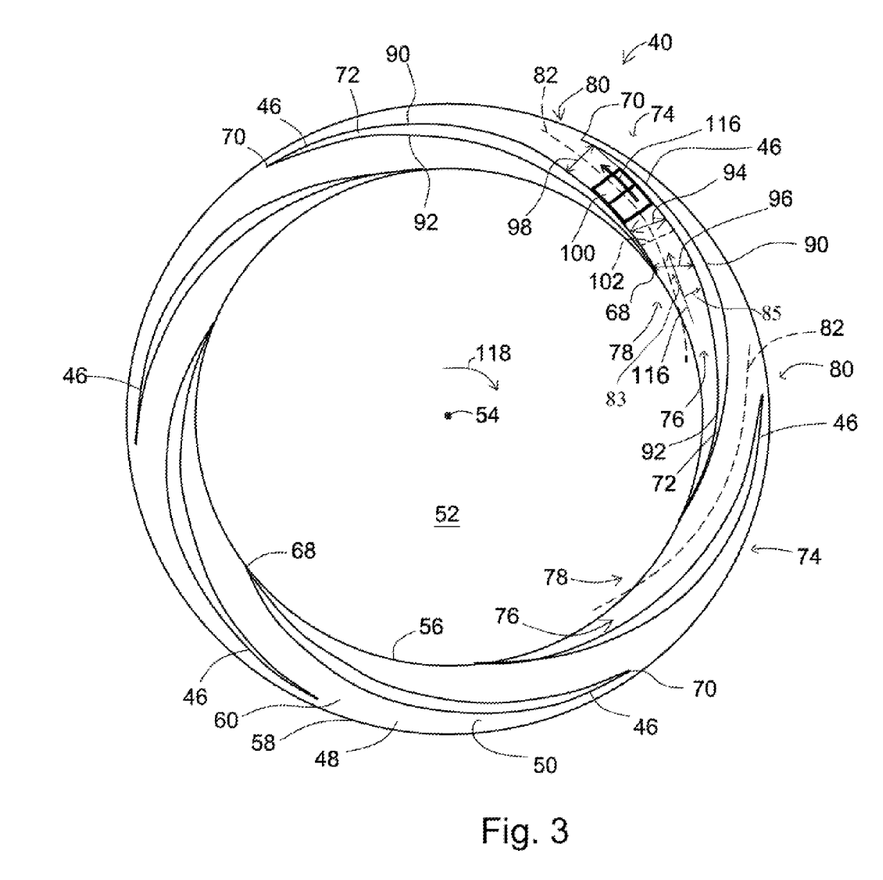
FIG. 3 is a sectional view of the supersonic compressor rotor shown in FIG. 2.
Figure 4:
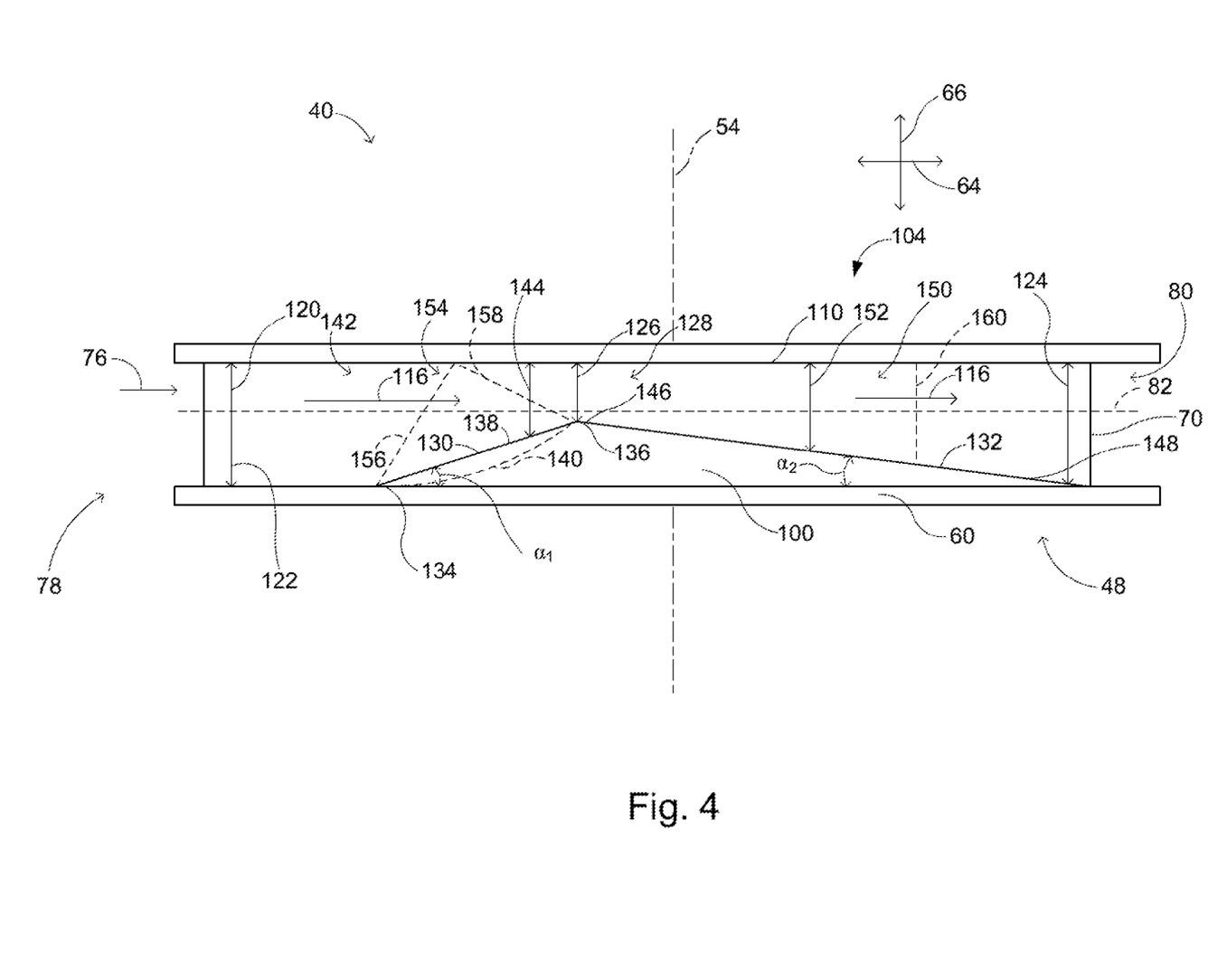
FIG. 4 is another sectional view of the supersonic compressor rotor shown in FIG. 2.

FIG. 2 is an exploded perspective view of supersonic compressor rotor 40. FIG. 3 is a sectional view of supersonic compressor rotor 40. FIG. 4 is another sectional view of a portion of supersonic compressor rotor 40. In the exemplary embodiment, supersonic compressor rotor 40 includes a plurality of vanes 46 that are coupled to a rotor disk 48. Rotor disk 48 includes an annular disk body 50 that defines an inner cylindrical cavity 52 extending generally axially through disk body 50 along a centerline axis 54. Disk body 50 includes a radially inner surface 56, a radially outer surface 58, and an endwall 60. Radially inner surface 56 defines inner cylindrical cavity 52. Inner cylindrical cavity 52 has a substantially cylindrical shape and is oriented about centerline axis 54. Inner cylindrical cavity 52 is sized to receive drive shaft 22 (shown in FIG. 1) therethrough. Endwall 60 extends radially outwardly from inner cylindrical cavity 52 and between radially inner surface 56 and radially outer surface 58. Endwall 60 includes a width 62 defined in a radial direction 64 that is oriented perpendicular to centerline axis 54.

In the exemplary embodiment, each vane 46 is coupled to endwall 60 and extends outwardly from endwall 60 in an axial direction 66 that is generally parallel to centerline axis 54. Each vane 46 includes an inlet edge 68, an outlet edge 70, and a sidewall 72 that extends between inlet edge 68 and outlet edge 70. Inlet edge 68 is positioned adjacent radially inner surface 56. Outlet edge 70 is positioned adjacent radially outer surface 58. In the exemplary embodiment, adjacent vanes 46 form a pair 74 of vanes 46. Each pair 74 is oriented to define a flow channel 76, an inlet opening 78, and an outlet opening 80 between adjacent vanes 46. Flow channel 76 extends between inlet opening 78 and outlet opening 80 and defines a flow path 82 (shown in FIG. 3) from inlet opening 78 to outlet opening 80. Flow path 82 is oriented generally parallel to sidewall 72. In the exemplary embodiment, flow path 82 includes a radial vector component and a tangential vector component. Flow channel 76 is sized, shaped, and oriented to channel fluid along flow path 82 from inlet opening 78 to outlet opening 80 in radial direction 64 such that fluid is characterized by having a tangential flow vector, represented by arrow 83, and a radial flow vector, represented by arrow 85 through flow path 82. Inlet opening 78 is defined between adjacent inlet edges 68 of adjacent vanes 46. Outlet opening 80 is defined between adjacent outlet edges 70 of adjacent vanes 46. Sidewall 72 extends radially between inlet edge 68 and outlet edge 70 such that vane 46 extends between radially inner surface 56 and radially outer surface 58. Sidewall 72 includes an outer surface 84 and an opposite inner surface 86. Sidewall 72 extends between outer surface 84 and inner surface 86 to define an axial height 88 of flow channel 76 from outer surface 84 to inner surface 86.

Each sidewall 72 includes a first side, i.e. a pressure side 90 and an opposing second side, i.e. a suction side 92. Each pressure side 90 and suction side 92 extends between inlet edge 68 and outlet edge 70. Each vane 46 is spaced circumferentially about inner cylindrical cavity 52 such that flow channel 76 is oriented generally radially between inlet opening 78 and outlet opening 80. Each inlet opening 78 extends between a pressure side 90 and an adjacent suction side 92 of vane 46 at inlet edge 68. Each outlet opening 80 extends between pressure side 90 and an adjacent suction side 92 at outlet edge 70 such that flow path 82 is defined radially outwardly from radially inner surface 56 to radially outer surface 58 in radial direction 64. Alternatively, adjacent vanes 46 may be oriented such that inlet opening 78 is defined at radially outer surface 58 and outlet opening 80 is defined at radially inner surface 56 such that flow path 82 is defined radially inwardly from radially outer surface 58 to radially inner surface 56.

In the exemplary embodiment, flow channel 76 includes a width 94 that is defined between pressure side 90 and adjacent suction side 92, and is perpendicular to flow path 82. Inlet opening 78 has a first circumferential width 96 that is larger than a second circumferential width 98 of outlet opening 80. Alternatively, first circumferential width 96 of inlet opening 78 may be less than, or equal to, second circumferential width 98 of outlet opening 80.

In the exemplary embodiment, at least one supersonic compression ramp 100 is coupled to endwall 60 and extends outwardly from endwall 60 in axial direction 66. Supersonic compression ramp 100 is positioned between inlet opening 78 and outlet opening 80 and extends at least partially into flow channel 76 from endwall 60. Supersonic compression ramp 100 is sized, shaped, and oriented to enable one or more compression waves 102 to form within flow channel 76.

A shroud assembly 104 is coupled to outer surface 84 of each vane 46 such that flow channel 76 is defined between shroud assembly 104 and endwall 60. Shroud assembly 104 includes an inner edge 106, an outer edge 108, and a shroud plate 110 that extends radially between inner edge 106 and outer edge 108. Inner edge 106 defines a substantially cylindrical opening 112. Shroud assembly 104 is oriented coaxially with respect to rotor disk 48, such that inner cylindrical cavity 52 is concentric with opening 112. Shroud assembly 104 is coupled to each vane 46 such that inlet edge 68 of vane 46 is positioned adjacent inner edge 106 of shroud assembly 104, and outlet edge 70 of vane 46 is positioned adjacent outer edge 108 of shroud assembly 104. Each vane 46 extends axially between an inner surface 114 of shroud plate 110 and endwall 60. Alternatively, supersonic compressor rotor 40 does not include shroud assembly 104. In such an embodiment, a diaphragm assembly (not shown) is positioned adjacent each outer surface 84 of vanes 46 such that the diaphragm assembly at least partially defines flow channel 76.

During operation of supersonic compressor rotor 40, intake section 12 (shown in FIG. 1) channels a fluid 116 towards inlet opening 78 of flow channel 76. Fluid 116 has a first velocity, i.e. an approach velocity, just prior to entering inlet opening 78. Supersonic compressor rotor 40 is rotated about centerline axis 54 at a second velocity, i.e. a rotational velocity, represented by arrow 118, such that fluid 116 entering flow channel 76 includes a third velocity, i.e. an inlet velocity at inlet opening 78 that is supersonic relative to vanes 46. As fluid 116 is channeled through flow channel 76 at a supersonic velocity, supersonic compression ramp 100 causes compression waves 102 to form within flow channel 76 to facilitate compressing fluid 116, such that fluid 116 includes an increased pressure and temperature, and/or includes a reduced volume at outlet opening 80.

In the exemplary embodiment, supersonic compression ramp 100 is coupled to endwall 60 to define flow channel 76 having a cross-sectional area 120 that varies along flow path 82. Cross-sectional area 120 of flow channel 76 is defined perpendicularly to flow path 82 and is equal to width 94 of flow channel 76 multiplied by axial height 88 of flow channel 76. Flow channel 76 includes a first area, i.e. an inlet cross-sectional area 122 at inlet opening 78, a second area, i.e. an outlet cross-sectional area 124 at outlet opening 80, and a third area, i.e. a minimum cross-sectional area 126 that is defined between inlet opening 78 and outlet opening 80. In the exemplary embodiment, supersonic compression ramp 100 defines a throat region 128 of flow channel 76. Throat region 128 includes minimum cross-sectional area 126 of flow channel 76. Minimum cross-sectional area 126 is less than inlet cross-sectional area 122 and outlet cross-sectional area 124. In one embodiment, minimum cross-sectional area 126 is equal to outlet cross-sectional area 124, wherein each of outlet cross-sectional area 124 and minimum cross-sectional area 126 is less than inlet cross-sectional area 122.

In the exemplary embodiment, supersonic compression ramp 100 includes a compression surface 130 and a diverging surface 132. Compression surface 130 includes a first edge, i.e. a leading edge 134 and a second edge, i.e. a trailing edge 136. Leading edge 134 is positioned closer to inlet opening 78 than trailing edge 136. Compression surface 130 extends between leading edge 134 and trailing edge 136 and is oriented at an oblique angle $\alpha_1$ from endwall 60 and into flow channel 76. In the exemplary embodiment, compression surface 130 extends outwardly from endwall 60 and into flow channel 76 such that angle $\alpha_1$ is defined between about 2° and about 10° as measured between endwall 60 and compression surface 130. Alternatively, compression surface 130 may be oriented with respect to endwall 60 such that angle $\alpha_1$ may be any suitable angle sufficient to enable supersonic compression ramp 100 to function as described herein. In the exemplary embodiment, compression surface 130 includes a substantially planar surface 138 that extends between leading edge 134 and trailing edge 136. In an alternative embodiment, compression surface 130 includes an arcuate surface 140 (shown in phantom lines) that extends between leading edge 134 and trailing edge 136.

In the exemplary embodiment, compression surface 130 converges towards shroud plate 110 such that a compression region 142 is defined between leading edge 134 and trailing edge 136. Compression region 142 includes a cross-sectional area 144 of flow channel 76 that is reduced along flow path 82 from leading edge 134 to trailing edge 136. Trailing edge 136 of compression surface 130 defines throat region 128. Diverging surface 132 is coupled to compression surface 130 and extends downstream from compression surface 130 towards outlet opening 80. Diverging surface 132 includes a first end 146 and a second end 148 that is closer to outlet opening 80 than first end 146. First end 146 of diverging surface 132 is coupled to trailing edge 136 of compression surface 130. Diverging surface 132 extends between first end 146 and second end 148 and is oriented at an oblique angle $\alpha_2$ with respect to endwall 60. Diverging surface 132 defines a diverging region 150 that includes a diverging cross-sectional area 152 that increases from trailing edge 136 of compression surface 130 to outlet opening 80. Diverging region 150 extends from throat region 128 to outlet opening 80.

During operation of supersonic compressor rotor 40, fluid 116 is channeled from inner cylindrical cavity 52 into inlet opening 78 at a velocity that is supersonic with respect to rotor disk 48. Fluid 116 entering flow channel 76 from inner cylindrical cavity 52 is channeled through compression region 142 and contacts supersonic compression ramp 100. Supersonic compression ramp 100 is sized, shaped, and oriented to cause a system 154 of compression waves 102 to be formed within flow channel 76. System 154 includes a first oblique shockwave 156 that is formed as fluid 116 is channeled across supersonic compression ramp 100 and through compression region 142. Compression surface 130 causes first oblique shockwave 156 to be formed at leading edge 134 of compression surface 130. First oblique shockwave 156 extends across flow path 82 from leading edge 134 to shroud plate 110, and is oriented at an oblique angle with respect to flow path 82. First oblique shockwave 156 contacts shroud plate 110 and forms a second oblique shockwave 158 that is reflected from shroud plate 110 towards trailing edge 136 of compression surface 130 at an oblique angle with respect to flow path 82. Supersonic compression ramp 100 is configured to cause each first oblique shockwave 156 and second oblique shockwave 158 to form within compression region 142. As fluid is channeled through throat region 128 towards outlet opening 80, a normal shockwave 160 is formed within diverging region 150. Normal shockwave 160 is oriented perpendicular to flow path 82 and extends across flow path 82.

As fluid 116 passes through compression region 142, a velocity of fluid 116 is reduced as fluid 116 passes through each first oblique shockwave 156 and second oblique shockwave 158. In addition, a pressure of fluid 116 is increased, and a volume of fluid 116 is reduced. As fluid 116 passes through throat region 128, a velocity of fluid 116 is increased downstream of throat region 128 to normal shockwave 160. As fluid passes through normal shockwave 160, a velocity of fluid 116 is decreased to a subsonic velocity relative to vanes 46.

Figure 5:
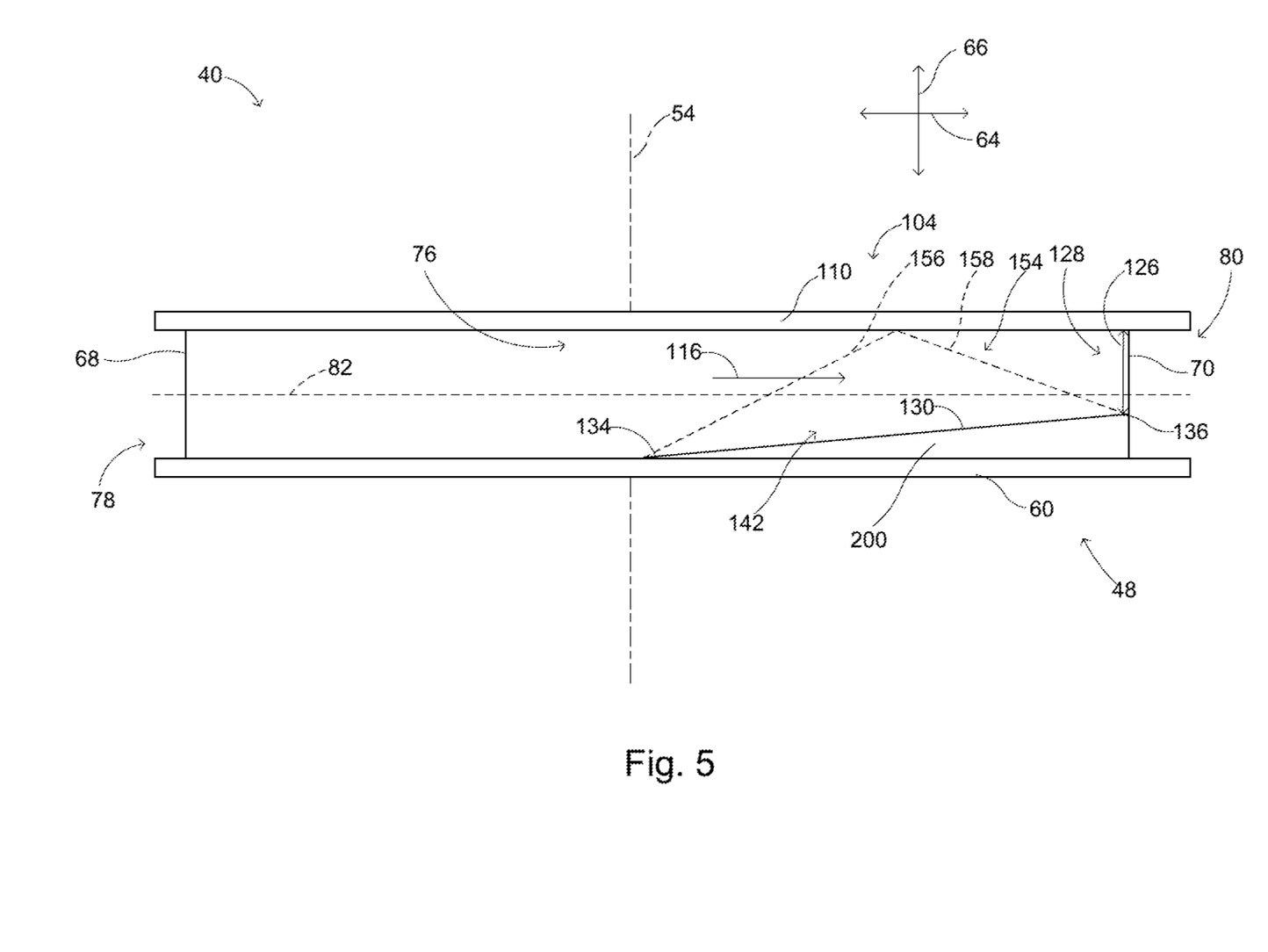
FIG. 5 is a sectional view of an alternative embodiment of the supersonic compressor rotor shown in FIG. 4.

FIG. 5 is a sectional view of an alternative embodiment of supersonic compressor rotor 40 that includes an alternative supersonic compression ramp 200. In an alternative embodiment, supersonic compression ramp 200 is configured to prevent normal shockwave 160 (shown in FIG. 4) from being formed in flow channel 76. Supersonic compression ramp 200 includes a compression surface 130 that is positioned within flow channel 76 such that throat region 128 is defined adjacent outlet opening 80. Moreover, trailing edge 136 of compression surface 130 is positioned adjacent outlet opening 80 such that supersonic compression ramp 200 does not include diverging surface 132. During operation, as fluid 116 is channeled through flow channel 76, supersonic compression ramp 200 conditions fluid 116 being channeled through throat region 128 to include a velocity at outlet opening 80 that is supersonic with respect to rotor disk 48.

Figure 6:
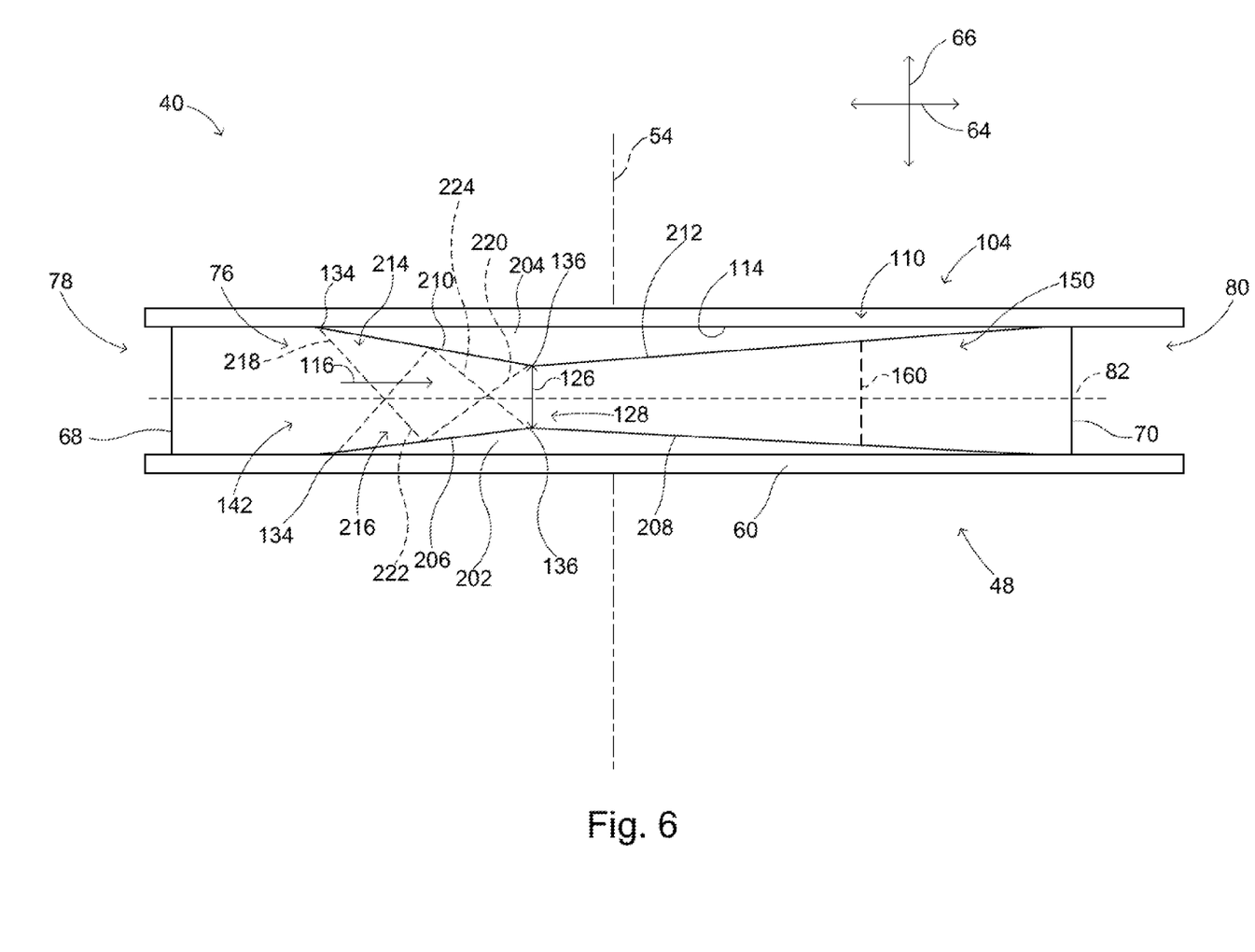
FIG. 6 is a sectional view of another alternative embodiment of the supersonic compressor rotor shown in FIG. 4.

FIG. 6 is a sectional view of another alternative embodiment of supersonic compressor rotor 40. In the alternative embodiment, supersonic compressor rotor 40 includes a first supersonic compression ramp 202 and a second supersonic compression ramp 204. First supersonic compression ramp 202 is coupled to endwall 60 and is positioned within flow channel 76, and between inlet opening 78 and outlet opening 80. Second supersonic compression ramp 204 is coupled to inner surface 114 of shroud plate 110 and extends from shroud plate 110 towards endwall 60, and into flow channel 76. Second supersonic compression ramp 204 is positioned with respect to first supersonic compression ramp 202 such that throat region 128 is defined between first supersonic compression ramp 202 and second supersonic compression ramp 204. First supersonic compression ramp 202 includes a first compression surface 206 and a first diverging surface 208. Second supersonic compression ramp 204 includes a second compression surface 210 and a second diverging surface 212. Each of first compression surface 206 and second compression surface 210 includes a leading edge 134 and a trailing edge 136. Throat region 128 is defined between each trailing edge 136. Compression region 142 is defined between first compression surface 206 and second compression surface 210. Diverging region 150 is defined between first diverging surface 208 and second diverging surface 212.

In the alternative embodiment, during operation, as fluid 116 is channeled through flow channel 76, first supersonic compression ramp 202 causes a first system 214 of compression waves 102 to be formed within compression region 142 of flow channel 76. Second supersonic compression region 142 causes a second system 216 of compression waves 102 to be formed within compression region 142 that is substantially opposite first system 214. First system 214 includes a first oblique shockwave 218 that extends across flow path 82 from first compression surface 206 at leading edge 134 to second compression surface 210. First oblique shockwave 218 contacts second compression surface 210 and forms a second oblique shockwave 220 that is reflected from second compression surface 210 towards trailing edge 136 of first compression surface 206. Second system 216 includes a third oblique shockwave 222 that extends across flow path 82 from leading edge 134 of second compression surface 210 to first compression surface 206. First compression surface 206 reflects third oblique shockwave 222 to form a fourth oblique shockwave 224 that extends from first compression surface 206 towards trailing edge 136 of second compression surface 210. Each of first supersonic compression ramp 202 and second supersonic compression ramp 204 are configured to cause normal shockwave 160 to form downstream of throat region 128 and within diverging region 150.

The above-described supersonic compressor rotor provides a cost effective and reliable method for channeling a fluid radially through a supersonic compressor system. More specifically, the supersonic compressor rotor described herein includes a supersonic compression ramp that is coupled to an endwall of a rotor disk to define the radial flow channel. By providing a supersonic compressor rotor with a radial flow channel, a supersonic compressor system may be designed with a radial flow discharge. As a result, the supersonic compressor rotor reduces a number of components in known supersonic compressor assemblies that are required to adjust an axial flow direction to a radial flow direction. As such, the cost of maintaining the supersonic compressor system may be reduced.

Exemplary embodiments of systems and methods for assembling a supersonic compressor rotor are described above in detail. The system and methods are not limited to the specific embodiments described herein, but rather, components of systems and/or steps of the method may be utilized independently and separately from other components and/or steps described herein. For example, the systems and methods may also be used in combination with other rotary engine systems and methods, and are not limited to practice with only the supersonic compressor system as described herein. Rather, the exemplary embodiment can be implemented and utilized in connection with many other rotary system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A supersonic compressor rotor comprising:
   a rotor disk comprising a substantially cylindrical endwall, a radially inner surface, and a radially outer surface, said endwall extending between said radially inner surface and said radially outer surface;
   a plurality of vanes coupled to said endwall, said vanes extending outwardly from said endwall, adjacent vanes forming a pair and are spaced a circumferential distance apart such that a flow channel is defined between each said pair of circumferentially-adjacent vanes, said flow channel extending generally radially between an inlet opening and an outlet opening;
   a first supersonic compression ramp coupled to said endwall, said first supersonic compression ramp positioned within said flow channel to facilitate forming at least one compression wave within said flow channel;
   a shroud assembly coupled to the vanes, the vanes extending between an inner surface of said shroud assembly and the endwall; and
   a second supersonic compression ramp coupled to the inner surface of the shroud assembly, the second compression ramp extending from the inner surface of the shroud assembly towards said endwall, the second supersonic compression ramp being positioned with respect to the first supersonic compression ramp such that a throat region is defined between the first supersonic compression ramp and the second supersonic compression ramp.

2. A supersonic compressor rotor in accordance with claim 1, wherein said first supersonic compression ramp comprises a compression surface extending outwardly from said endwall at an oblique angle and into said flow channel, said compression surface including a leading edge and a trailing edge, said trailing edge positioned nearer said outlet opening than said leading edge, said trailing edge defining a throat region of said flow channel, said throat region having a minimum cross-sectional area of said flow channel.

3. A supersonic compressor rotor in accordance with claim 2, wherein said compression surface is substantially planar.

4. A supersonic compressor rotor in accordance with claim 2, wherein said compression surface is substantially arcuate.

5. A supersonic compressor rotor in accordance with claim 2, wherein said compression surface is oriented at an angle between about 2 degrees and about 10 degrees with respect to said endwall.

6. A supersonic compressor rotor in accordance with claim 2, wherein said trailing edge of said compression ramp is positioned adjacent said outlet opening of said flow channel.

7. A supersonic compressor rotor in accordance with claim 2, wherein said compression ramp comprises a diverging surface coupled to said trailing edge of said compression surface, said diverging surface extending inwardly from said trailing edge towards said endwall at an oblique angle.

8. A supersonic compressor system comprising:
   a housing comprising an inner surface defining a cavity extending between a fluid inlet and a fluid outlet;
   a rotor shaft positioned within said housing, said rotor shaft rotatably coupled to a driving assembly; and
   a supersonic compressor rotor coupled to said rotor shaft, said supersonic compressor rotor positioned between said fluid inlet and said fluid outlet for channeling fluid from said fluid inlet to said fluid outlet, said supersonic compressor rotor comprising:
      a rotor disk comprising a substantially cylindrical endwall, a radially inner surface, and a radially outer surface, said endwall extending between said radially inner surface and said radially outer surface;
      a plurality of vanes coupled to said endwall, said vanes extending outwardly from said endwall, adjacent vanes forming a pair and are spaced a circumferential distance apart such that a flow channel is defined between each said pair of circumferentially-adjacent vanes, said flow channel extending generally radially between an inlet opening and an outlet opening;
      a first supersonic compression ramp coupled to said endwall, said first supersonic compression ramp positioned within said flow channel to facilitate forming at least one compression wave within said flow channel;
   a shroud assembly coupled to the vanes, the vanes extending between an inner surface of said shroud assembly and the endwall; and
   a second supersonic compression ramp coupled to the inner surface of the shroud assembly, the second compression ramp extending from the inner surface of the shroud assembly towards said endwall, the second supersonic compression ramp being positioned with respect to the first supersonic compression ramp such that a throat region is defined between the first supersonic compression ramp and the second supersonic compression ramp.

9. A supersonic compressor system in accordance with claim 8, wherein said first supersonic compression ramp comprises a compression surface extending outwardly from said endwall at an oblique angle and into said flow channel, said compression surface including a leading edge and a trailing edge, said trailing edge positioned nearer said outlet opening than said leading edge, said trailing edge defining a throat region of said flow channel, said throat region having a minimum cross-sectional area of said flow channel.

10. A supersonic compressor system in accordance with claim 9, wherein said compression surface is substantially planar.

11. A supersonic compressor system in accordance with claim 9, wherein said compression surface is substantially arcuate.

12. A supersonic compressor system in accordance with claim 9, wherein said compression surface is oriented at an angle between about 2 degrees and about 10 degrees with respect to said endwall.

13. A method of assembling a supersonic compressor rotor, said method comprising:
providing a rotor disk that includes an endwall, a radially inner surface, and a radially outer surface, the endwall extending between the radially inner surface and the radially outer surface;
coupling a plurality of vanes to the endwall, adjacent vanes forming a pair and spaced a circumferential distance apart such that a flow channel is defined between each pair of circumferentially-adjacent vanes, the flow channel extending generally radially between an inlet opening and an outlet opening;
coupling a first supersonic compression ramp to the endwall, the first supersonic compression ramp configured to enable at least one compression wave to form within the flow channel;
coupling a shroud assembly to the vanes, the vanes extending between an inner surface of the shroud assembly and the endwall; and
coupling a second supersonic compression ramp to the inner surface of the shroud assembly, the second supersonic compression ramp extending from the inner surface of the shroud towards the endwall, the second supersonic compression ramp positioned with respect to the first supersonic compression ramp such that a throat region is defined between the first supersonic compression ramp and the second supersonic compression ramp.

14. A method in accordance with claim 13, wherein the step of coupling a first supersonic compression ramp to the endwall comprises coupling a compression surface to the endwall, the compression surface extending outwardly from the endwall at an oblique angle and into the flow channel, the compression surface including a leading edge and a trailing edge, the trailing edge being positioned closer to the outlet opening than the leading edge, the trailing edge defining a throat region of the flow channel.

15. A method in accordance with claim 14, further comprising positioning the trailing edge of the compression surface adjacent the outlet opening of the flow channel.

16. A method in accordance with claim 14, further comprising coupling a diverging surface to the trailing edge of the compression surface, the diverging surface extending inwardly from the trailing edge towards the endwall at an oblique angle, the diverging surface extending from the compression surface towards the outlet opening.

* * * * *